US012077276B2

(12) United States Patent
Schellaars (10) Patent No.: US 12,077,276 B2
(45) Date of Patent: Sep. 3, 2024

(54) CARGO HOOK ASSEMBLY AND HELICOPTER

(71) Applicant: Helitak Fire Fighting Equipment Pty Ltd, Lake MacDonald (AU)

(72) Inventor: Jason Schellaars, Queensland (AU)

(73) Assignee: Helitak Fire Fighting Equipment Pty Ltd, Lake MacDonald (AU)

( * ) Notice: Subject to any disclaimer, the term of this patent is extended or adjusted under 35 U.S.C. 154(b) by 127 days.

(21) Appl. No.: 17/744,114

(22) Filed: May 13, 2022

(65) Prior Publication Data

US 2022/0267006 A1 Aug. 25, 2022

Related U.S. Application Data

(63) Continuation of application No. PCT/AU2020/051091, filed on Oct. 12, 2020.

(30) Foreign Application Priority Data

Nov. 14, 2019 (AU) ................................ 2019904296

(51) Int. Cl.
*B64C 1/22* (2006.01)
*B64C 1/20* (2006.01)
*B64C 27/06* (2006.01)
*B64D 1/22* (2006.01)
*B64D 9/00* (2006.01)
*B64D 1/12* (2006.01)

(52) U.S. Cl.
CPC .................. *B64C 1/22* (2013.01); *B64C 1/20* (2013.01); *B64C 27/06* (2013.01); *B64D 1/22* (2013.01); *B64D 9/00* (2013.01); *B64D 9/003* (2013.01); *B64D 1/12* (2013.01)

(58) Field of Classification Search
CPC .... B64C 1/22; B64D 1/08; B64D 1/22; B64D 9/00
See application file for complete search history.

(56) References Cited

U.S. PATENT DOCUMENTS

| 3,044,818 | A | * | 7/1962 | Tobey | ...................... | B64D 1/22 |
| | | | | | | 294/82.26 |
| 4,984,757 | A | * | 1/1991 | Hartung | .................... | B64D 1/22 |
| | | | | | | 56/235 |
| 2018/0215466 | A1 | * | 8/2018 | Hall | ...................... | A01G 23/081 |

* cited by examiner

*Primary Examiner* — Nicholas McFall
(74) *Attorney, Agent, or Firm* — William A. English; Vista IP Law Group LLP (57) ABSTRACT

A cargo hook assembly for a helicopter is provided. The cargo hook assembly comprises a support structure having a forward end portion and a rearward end portion, and an attachment mechanism attached to the rearward end portion. The attachment mechanism is configured to engage a cargo hook mount on the underside of the fuselage of the helicopter. The cargo hook assembly further comprises first and second struts extending from respective opposing sides of the forward end portion. Each of the first and second struts is configured to engage a respective side mount on the fuselage of the helicopter. The cargo hook assembly also comprises a cargo hook suspended from the support structure.

10 Claims, 11 Drawing Sheets

CARGO HOOK ASSEMBLY AND HELICOPTER

RELATED APPLICATION DATA

The present application is a continuation of co-pending International Application No. PCT/AU2020/051091, filed Oct. 12, 2020, which claims priority to Australian Patent Application No. 2019904296, filed Nov. 14, 2019, the entire disclosures of which are expressly incorporated by reference herein.

TECHNICAL FIELD

The present disclosure relates to a cargo hook assembly for a helicopter. The present disclosure also relates to a helicopter, and more particularly, a helicopter with a cargo hook assembly attached thereto.

BACKGROUND

The Sikorsky UH-60 Black Hawk helicopter is a frontline utility helicopter typically used in military forces around the world for air assault, air cavalry and medical evacuation operations. However, in recent years, Black Hawk helicopters have become popular for use in civilian operations including aerial firefighting and cargo transportation due to their high lifting capacities, flexible configuration and manoeuvrability.

Black Hawk helicopters are equipped with a cargo hook, which is a device mounted to a cargo hook mount disposed on the underside of the fuselage that allows for the transportation of external payloads during flight. Current cargo hooks typically only provide Black Hawk helicopters with a maximum lifting capacity of 8,000 pounds (3,600 kilograms). Typically, however, the maximum lifting capacity of 8,000 pounds is unable to be achieved safely due to the load of external payloads being concentrated at the cargo hook mount.

Due to ever-increasing costs associated with fuel, labour and maintenance, there is a need to safely maximise the lifting capacity of Black Hawk helicopters.

SUMMARY

In accordance with an aspect of the present disclosure, there is provided a cargo hook assembly for a helicopter, the cargo hook assembly comprising:
a support structure having a forward end portion and a rearward end portion;
an attachment mechanism attached to the rearward end portion and configured to engage a cargo hook mount on the underside of the fuselage of the helicopter;
first and second struts extending from respective opposing sides of the forward end portion, each of the first and second struts configured to engage a respective side mount on the fuselage of the helicopter; and
a cargo hook suspended from the support structure.

The attachment mechanism may have a body and first and second opposing mounting arm portions extending from the body. Each of the first and second opposing mounting arm portions may be configured to be fixedly received in respective first and second opposing couplers of the cargo hook mount.

The cargo hook may be suspended from the support structure at or near the rearward end portion.

The forward end portion may comprise a transverse member comprising first and second opposing ends. Each of the first and second struts may be hingedly attached to respective first and second opposing ends.

The cargo hook may be rotatable relative to the support structure.

In accordance with another aspect of the present disclosure, there is provided a helicopter comprising:
a fuselage having an underside and opposing sides;
two opposing side mounts disposed respectively on the opposing sides of the fuselage;
a cargo hook mount disposed on the underside of the fuselage; and
a cargo hook assembly comprising:
a support structure having a forward end portion and a rearward end portion;
an attachment mechanism attached to the rearward end portion and engaged with the cargo hook mount;
first and second struts extending from respective opposing sides of the forward end portion, each of the first and second struts being engaged with a respective side mount; and
a cargo hook suspended from the support structure.

The cargo hook mount may comprise first and second opposing couplers. The attachment mechanism may have a body and first and second opposing mounting arm portions extending from the body. Each of the first and second opposing mounting arm portions may be fixedly received in respective first and second opposing couplers.

The cargo hook may be suspended from the support structure at or near the rearward end portion.

The forward end portion may comprise a transverse member comprising first and second opposing ends. Each of the first and second struts may be hingedly attached to respective first and second opposing ends.

The cargo hook may be rotatable relative to the support structure.

Each of the side mounts may define an aperture. A free end portion of each of the first and second struts may define an aperture.

The helicopter may further comprise two or more fasteners for securing the first and second struts to respective side mounts. The apertures of the first and second struts and the apertures of the side mounts may be respectively aligned and secured by respective fasteners.

Each of the side mounts may be an External Stores Support System (ESSS) mount.

The helicopter may be a Black Hawk or Sea Hawk helicopter.

BRIEF DESCRIPTION OF DRAWINGS

Embodiments of the present disclosure will now be described hereinafter, by way of examples only, with reference to the accompanying drawings, in which.

DESCRIPTION OF EMBODIMENTS

Figure 1:
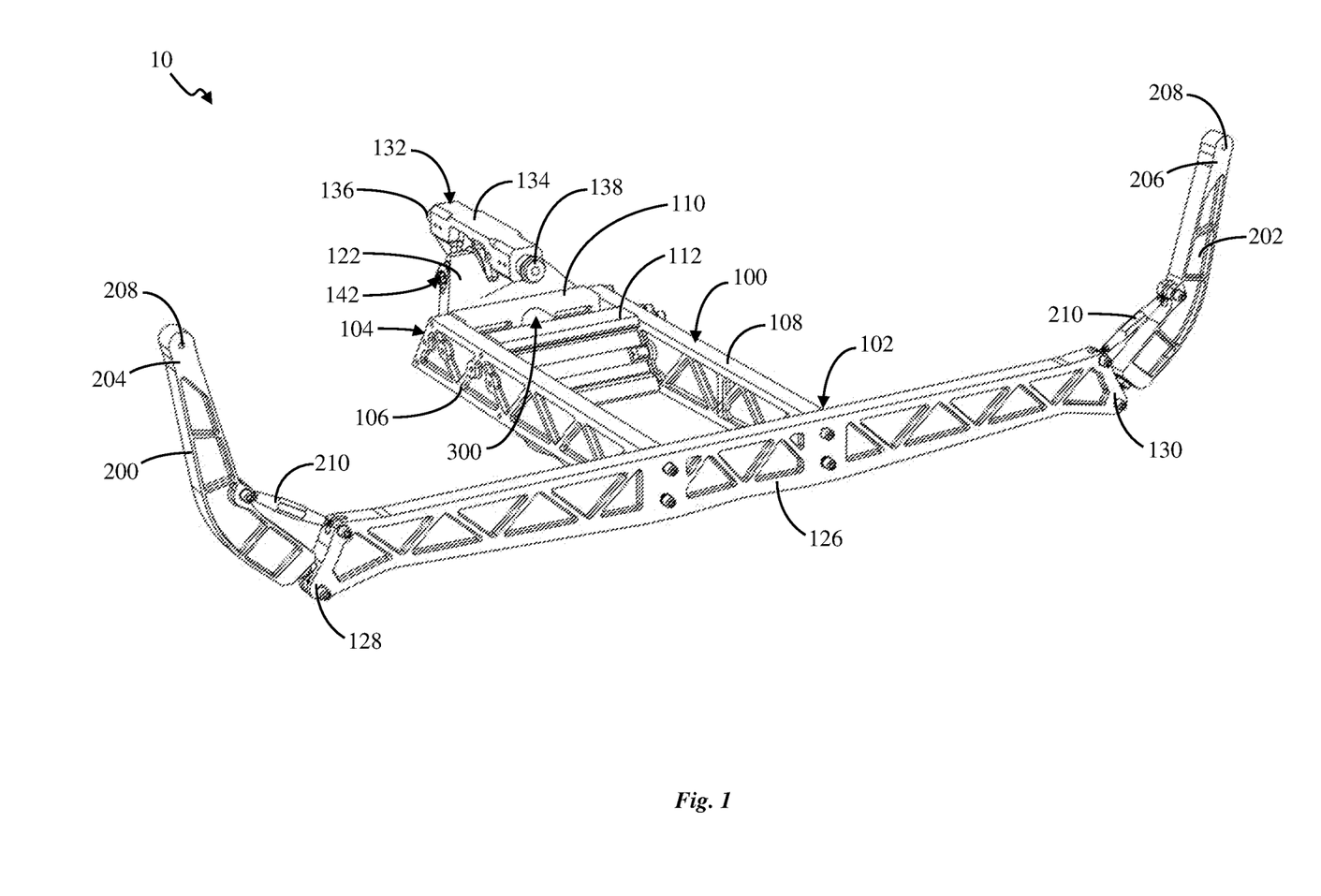
FIG. 1 is a perspective view of an embodiment of a cargo hook assembly.
Figure 2:
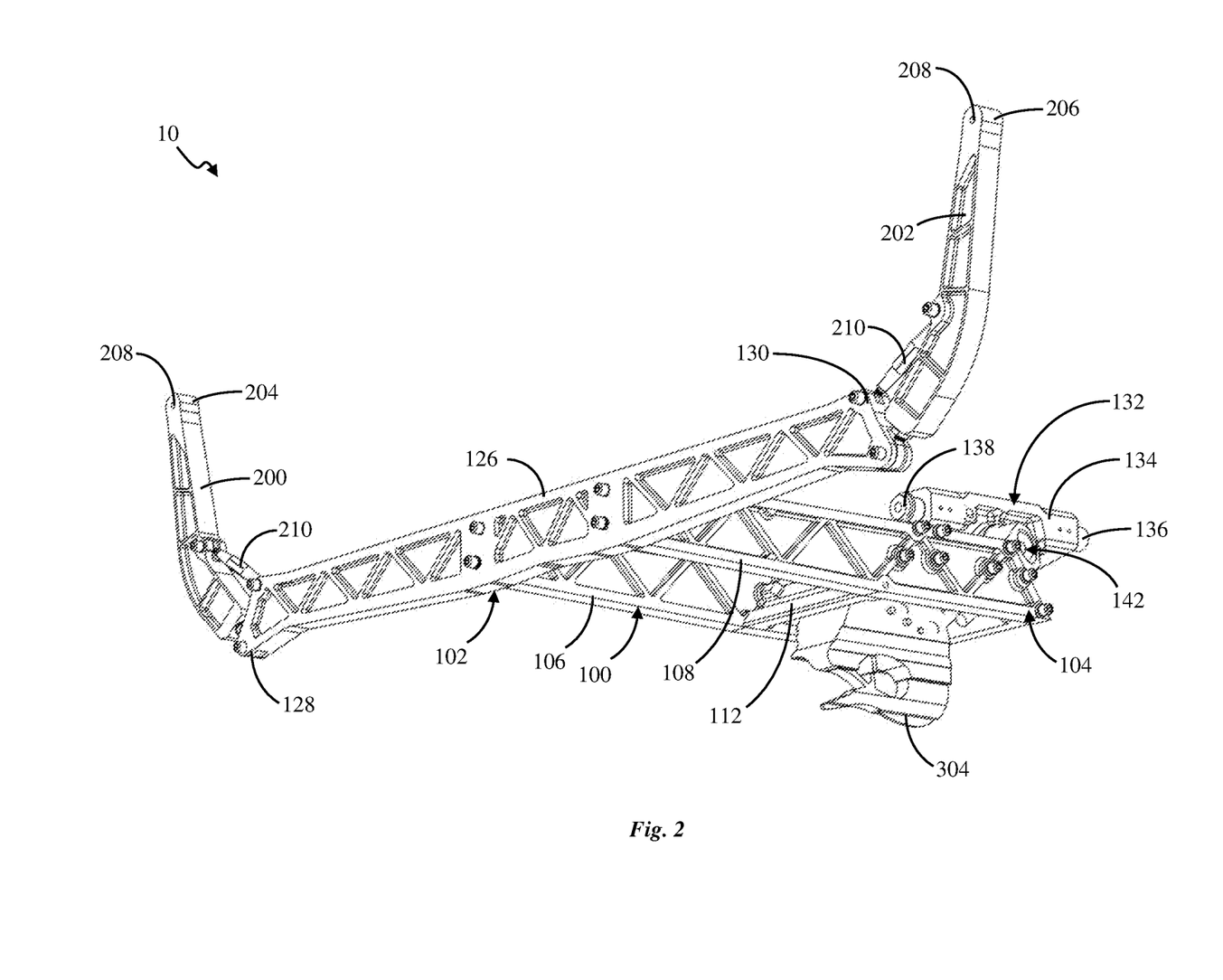
FIG. 2 is another perspective view of the cargo hook assembly of FIG. 1.
Figure 3:
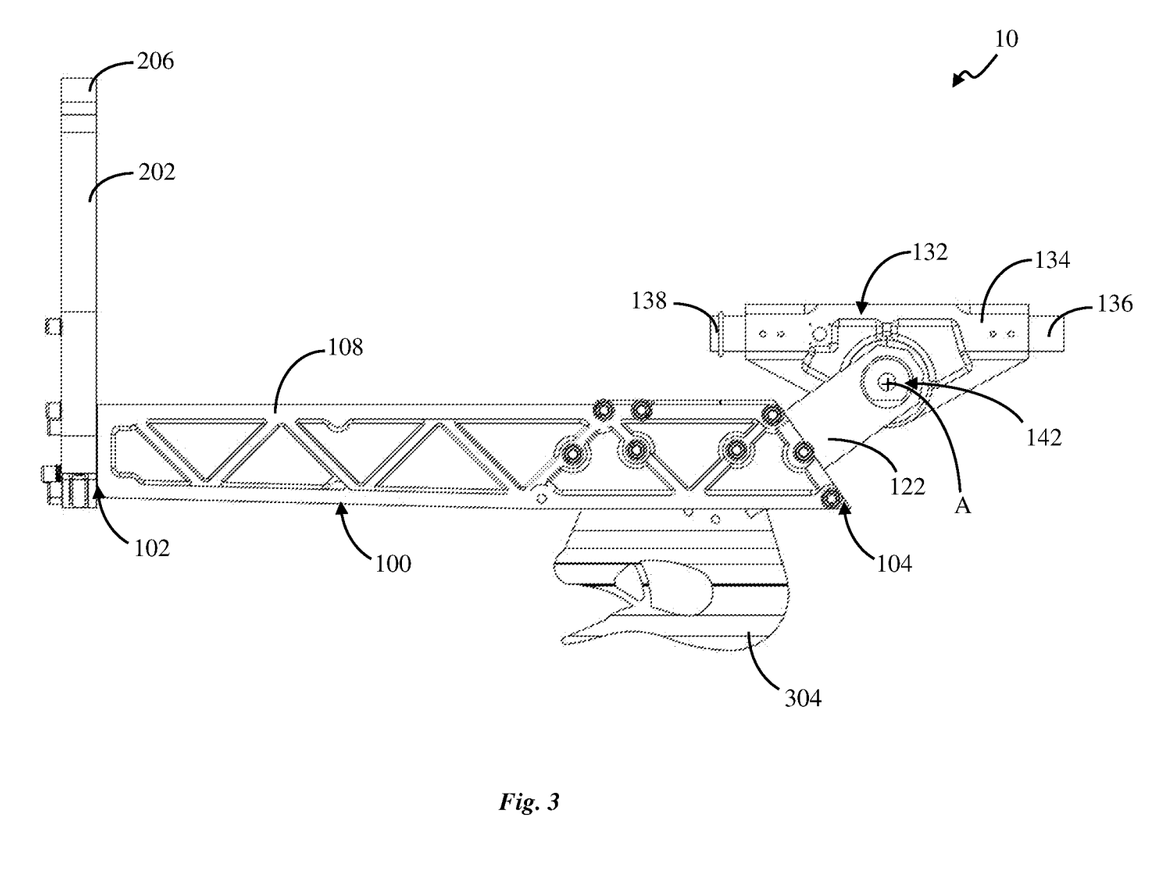
FIG. 3 is a side view of the cargo hook assembly of FIG. 1.
Figure 4:
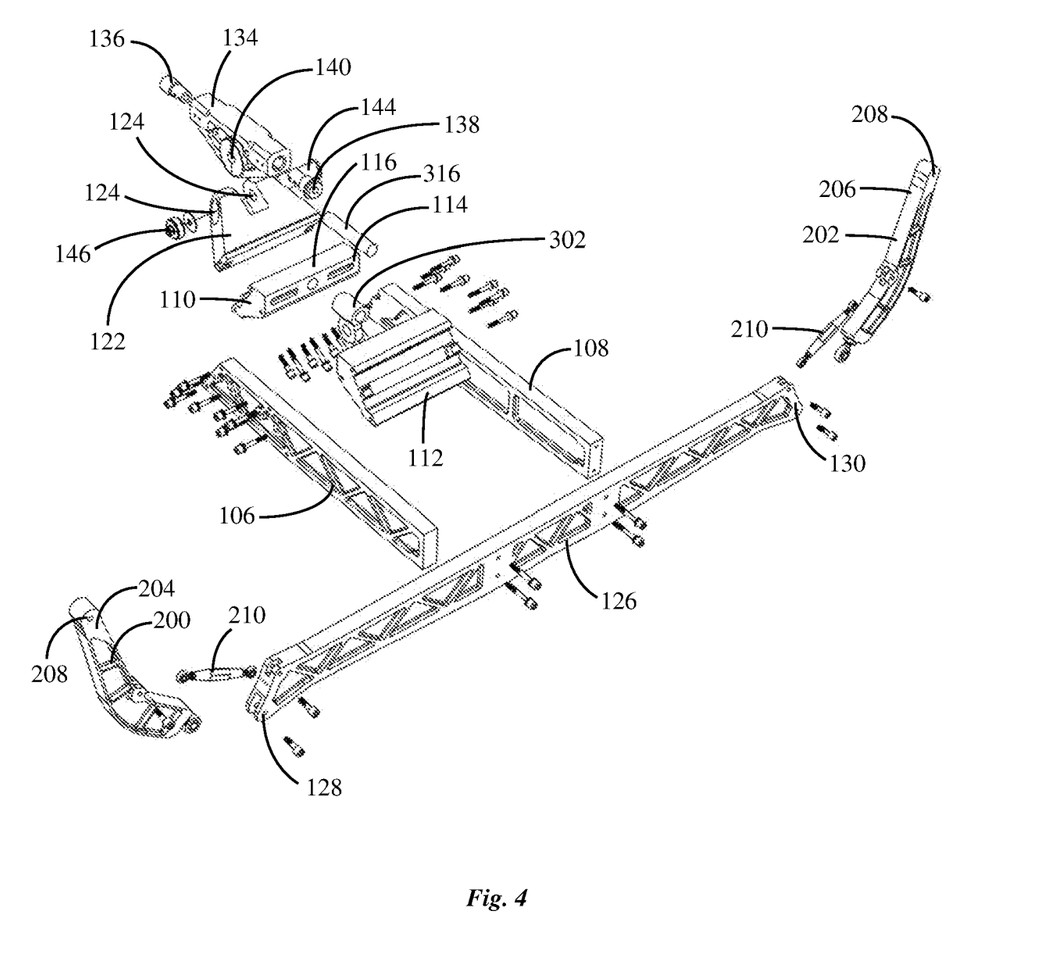
FIG. 4 is an exploded view of the cargo hook assembly of FIG. 1 without a cargo hook.
Figure 5:
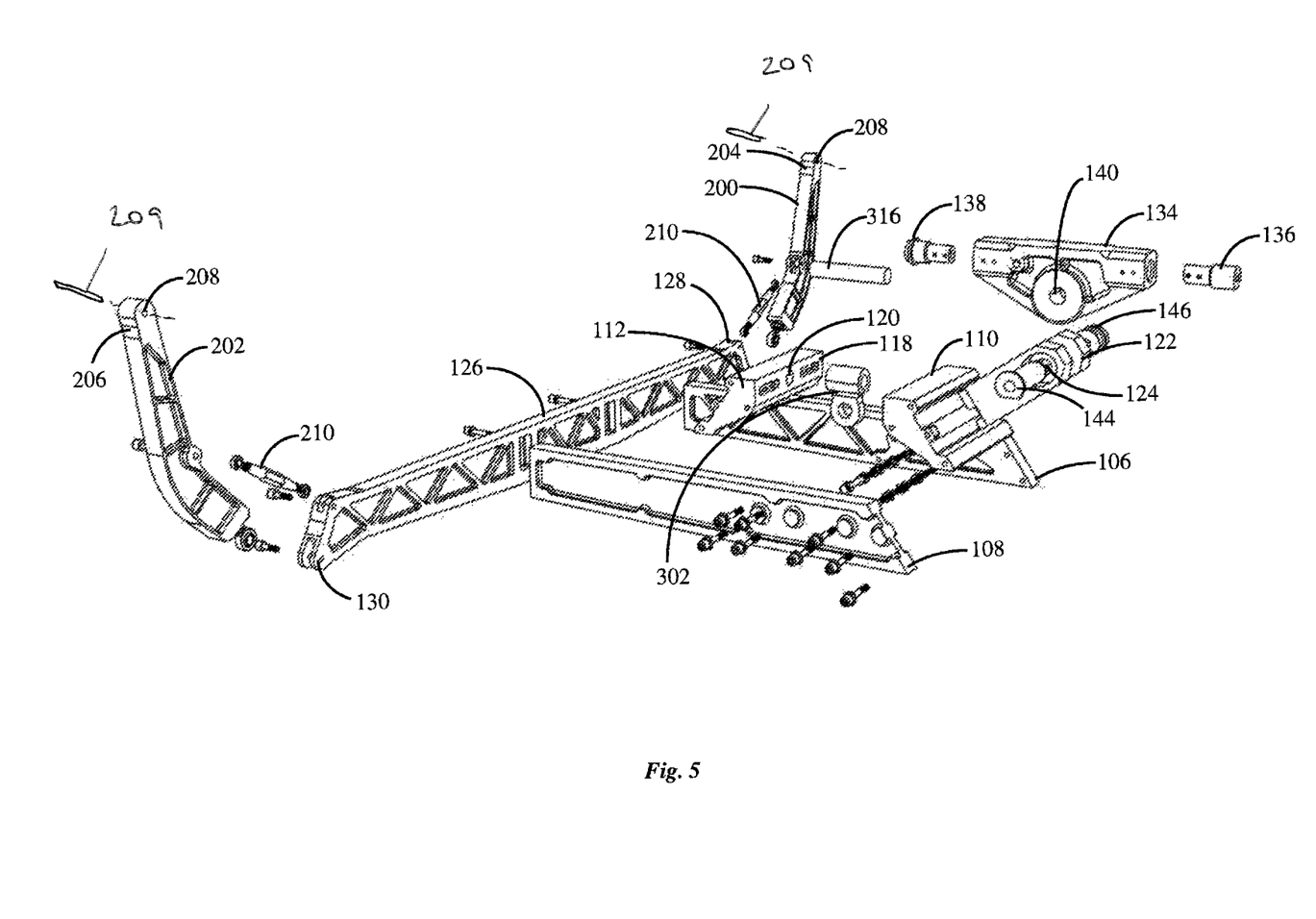
FIG. 5 is another exploded view of the cargo hook assembly of FIG. 1 without a cargo hook.

FIGS. 1 to 6 show an embodiment of a cargo hook assembly 10 for a helicopter 20. The cargo hook assembly 10 comprises a support structure 100 having a forward end portion 102 and a rearward end portion 104. The support structure 100 comprises two spaced-apart elongate members 106, 108 that extend between the forward and rearward end portions 102, 104. The support structure 100 also comprises a first transverse plate 110 and a second transverse plate 112 spaced from the first transverse plate 110. The first transverse plate 110 is fixed between the elongate members 106, 108 at the rearward end portion 104. The first transverse plate 110 has a forwardly-facing surface 114 with an aperture 116, as best shown in FIG. 4. The second transverse plate 112 is fixed between the elongate members 106, 108 between the forward and rearward end portions 102, 104. The second transverse plate 112 has a rearwardly-facing surface 118 with an aperture 120, as best shown in FIG. 5. Further, the support structure 100 comprises an attachment member 122 attached to the first transverse plate 110 and which extends rearwardly and upwardly therefrom. In this embodiment, the attachment member 122 is in the form of a clevis defining two opposed apertures 124. Moreover, the forward end portion 102 comprises a transverse member 126 with first and second opposing ends 128, 130. The transverse member 126 is attached to forward ends of the elongate members 106, 108.

The support structure 100 is formed from aluminium such as 6061-T6 aluminium, for example, or the like and may be integrally formed or bolted together.

Figure 6:
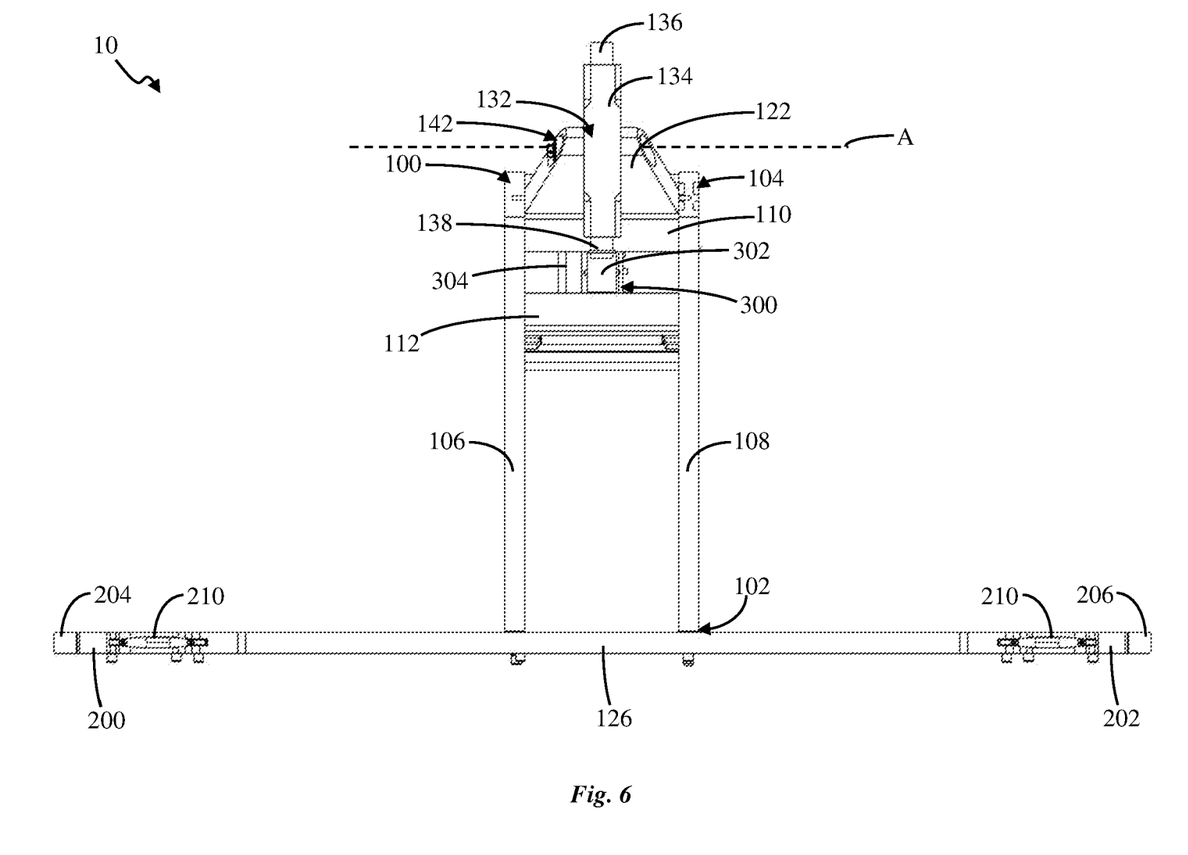
FIG. 6 is a top view of the cargo hook assembly of FIG. 1.

The support structure 100 further comprises an attachment mechanism 132 configured to engage a cargo hook mount 408 on the underside of the fuselage 400 of the helicopter 20. The attachment mechanism 132 comprises a body 134 and first and second mounting arm portions 136, 138, in the form of pins, that respectively extend outwardly from opposed ends of the body 134. Each of the mounting arm portions 136, 138 is configured to engage with the cargo hook mount 408 of the helicopter 20 for fixed attachment. The body 134 defines an aperture 140 therein (as shown in FIGS. 4 and 5) and is fixed to the attachment member 122 by a fastener 142. In this embodiment, the fastener 142 comprises a connecting pin 144 that transversely extends through each of the apertures 124 of the attachment member 122 and the aperture 140 of the body 134, and a locking mechanism 146 that engages with the connecting pin 144 to secure the body 134 of the attachment mechanism 132 to the attachment member 122. Engagement of the connecting pin 144 and the aperture 140 of the body 134 allows the attachment mechanism 132 to rotate about an axis A, as best shown in FIGS. 3 and 6. The attachment mechanism 132 is formed from aluminium such as 6061-T6 aluminium, for example, or the like.

The cargo hook assembly 10 further comprises first and second struts 200, 202 that are each configured to engage a respective side mount 408, 410 on the fuselage 400 of the helicopter 20. Each of the struts 200, 202 is hingedly attached to respective free ends 128, 130 of the transverse member 126 and extends upwardly from the transverse member 126 to a free end portion 204, 206. Each of the free end portions 204, 206 defines an aperture 208. Further, the cargo hook assembly 10 comprises two adjustment mechanisms 210 attached to the transverse member 126 and respective struts 200, 202. Each of the adjustment mechanisms 210 is configured to allow a user to move the respective free end portions 204, 206 of the struts 200, 202 relative to the transverse member 126. In this embodiment, each of the adjustment mechanisms 210 is in the form of a turnbuckle. The first and second struts 200, 202 are formed from aluminium such as 6061-T6 aluminium, for example, or the like.

In other embodiments, the first and second struts 200, 202 and the support structure 100 may be integrally formed.

Figure 7:
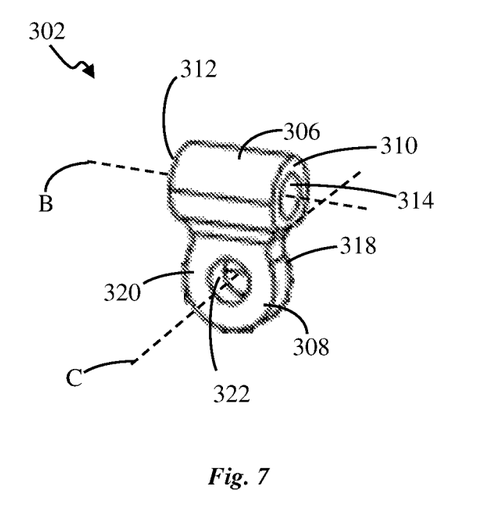
FIG. 7 is a perspective view of a connector of a hook assembly of the cargo hook assembly of FIG. 1.
Figure 8:
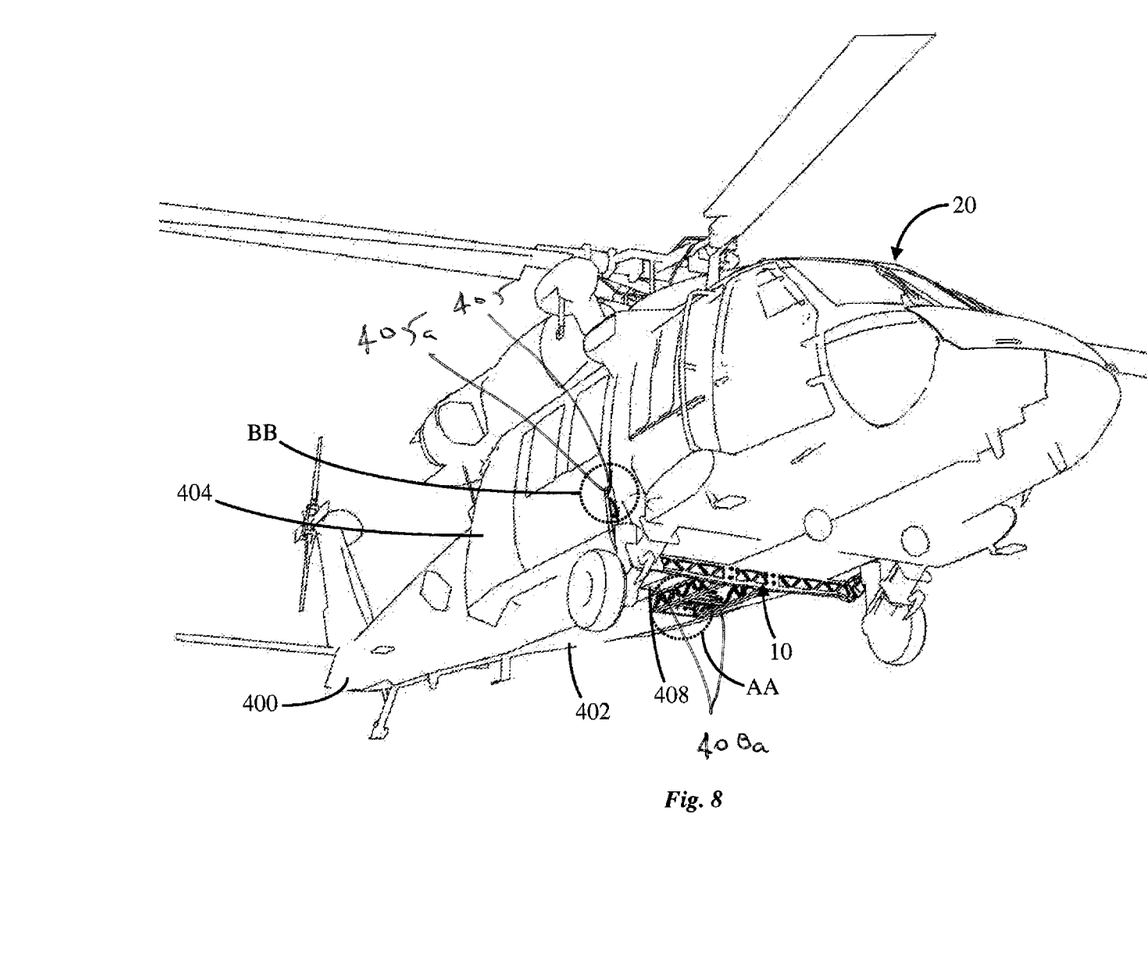
FIG. 8 is a perspective view of an embodiment of a helicopter with the cargo hook assembly of FIG. 1 attached thereto.
Figure 9:
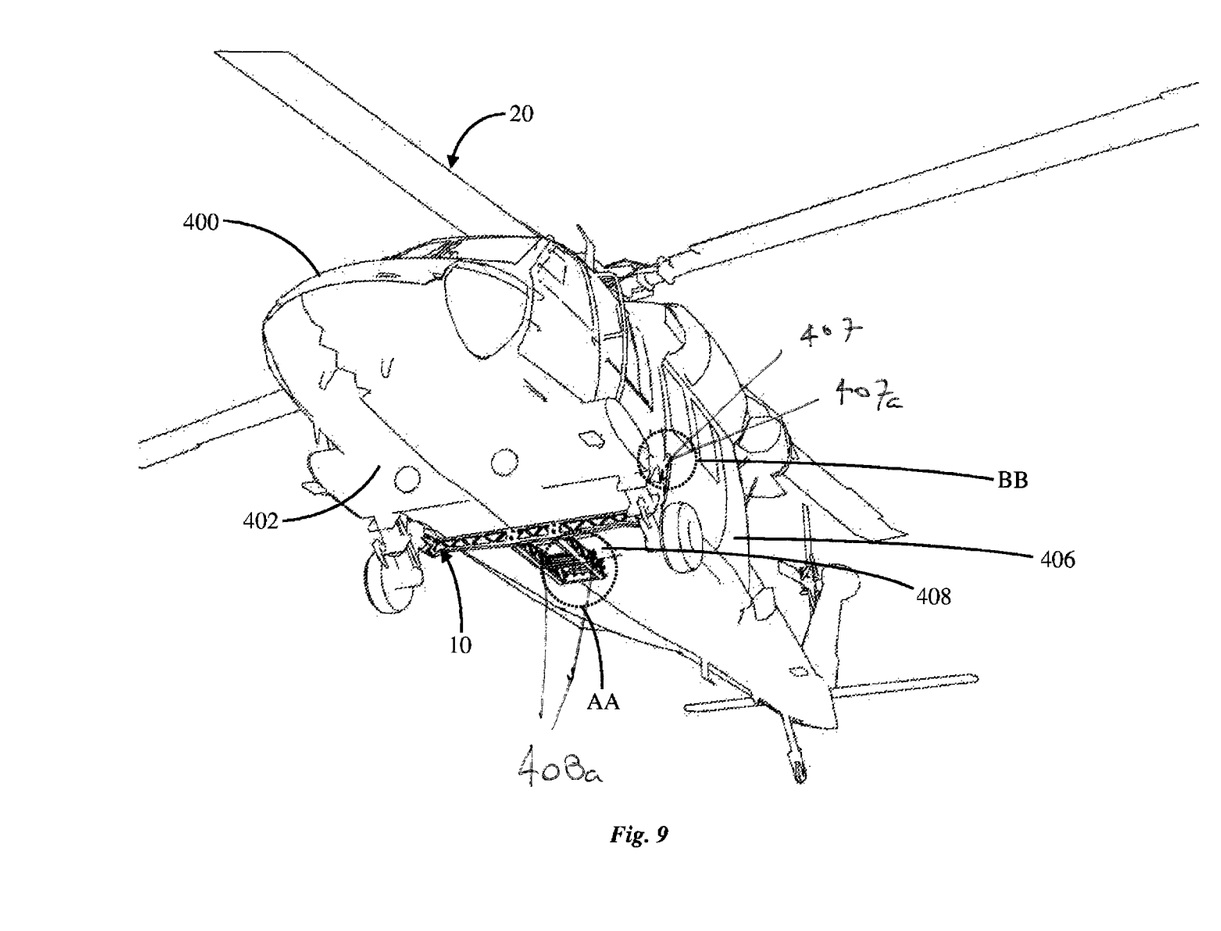
FIG. 9 is another perspective view of the helicopter of FIG. 8.
Figure 10:
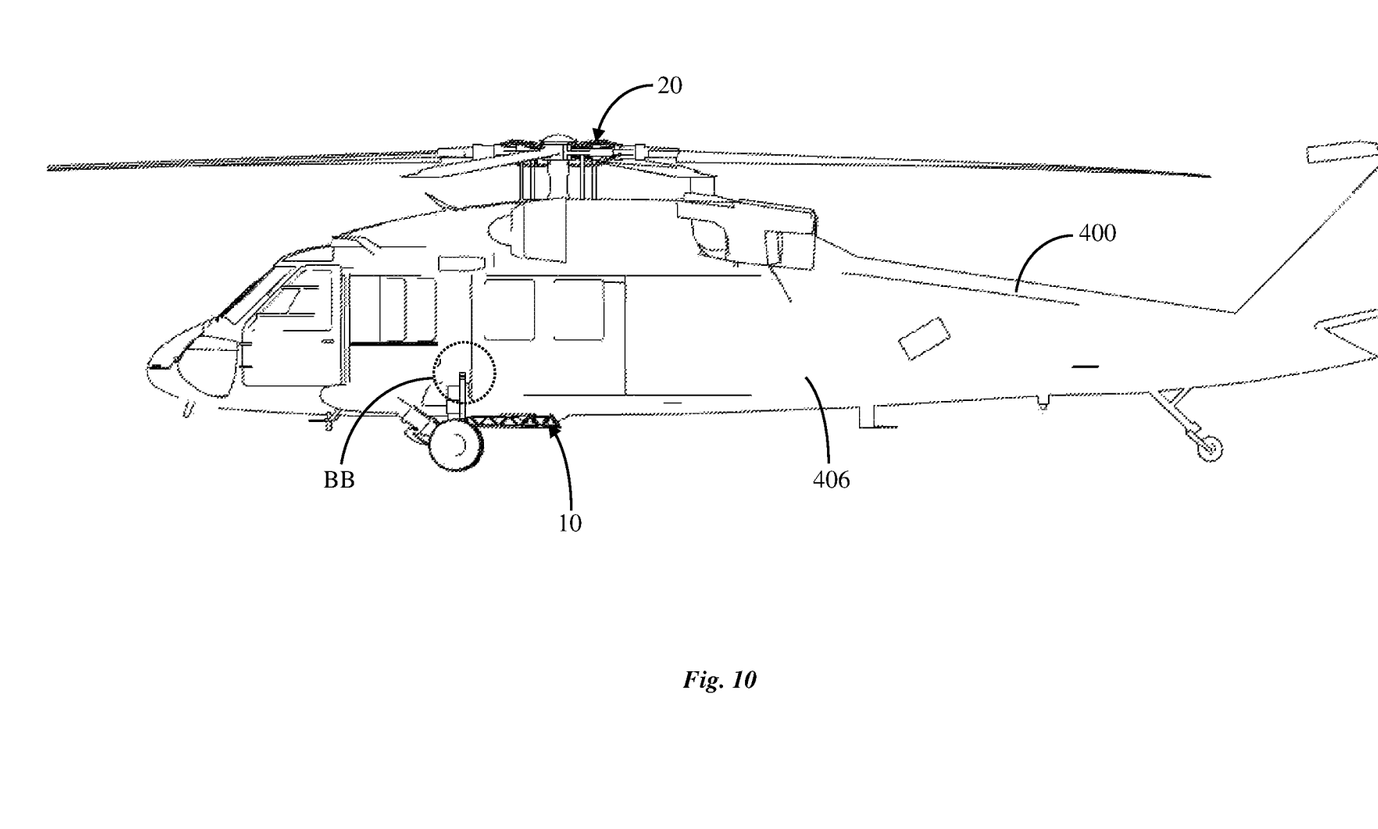
FIG. 10 is a side view of the helicopter of FIG. 8.
Figure 11:
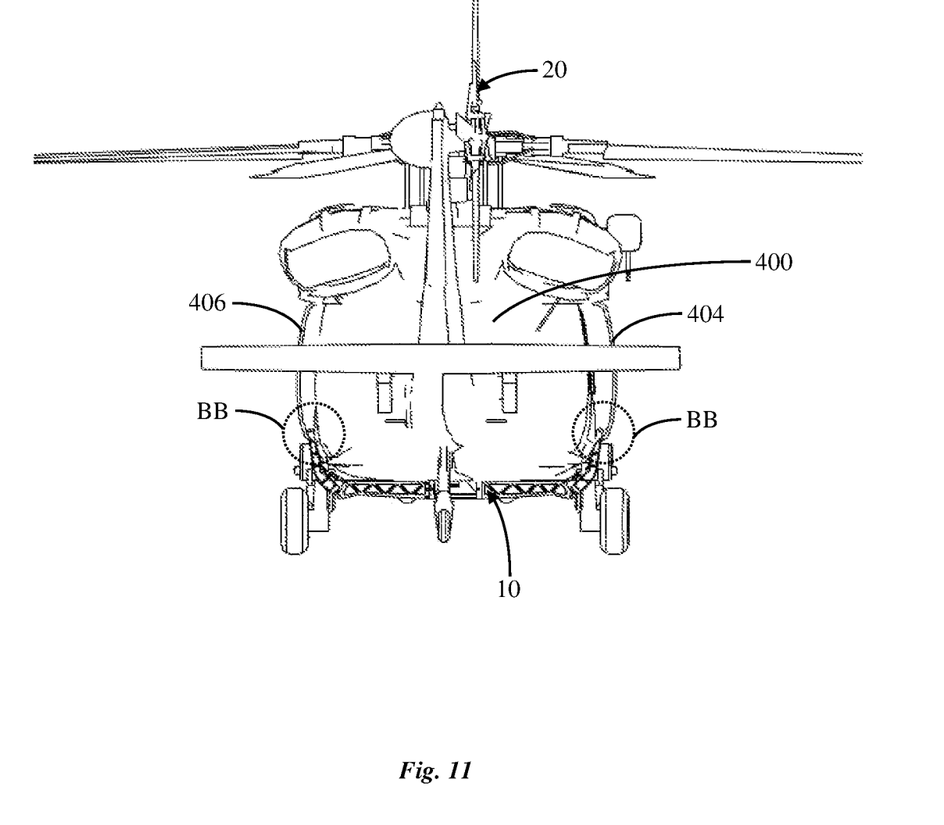
FIG. 11 is a rear view of the helicopter of FIG. 8.

The cargo hook assembly 10 also comprises a connector 302 and a cargo hook 304 attached thereto. With reference to FIG. 7, the connector 302 has an upper portion 306 and a lower portion 308 extending downwardly therefrom. The upper portion 306 has first and second opposing end surfaces 310, 312. The upper portion 306 also defines an aperture 314 that extends between the first and second end surfaces 310, 312 along an axis B. The upper portion 306 is disposed between the first and second transverse plates 110, 112 of the support structure 100 and is attached thereto by a pin 316 such that the first end surface 310 abuts the forwardly-facing surface 114 of the first transverse plate 110 and the second end surface 312 abuts the rearwardly-facing surface 118 of the second transverse plate 112, as best shown in FIG. 6. The pin 316 extends through the aperture 314 of the upper portion 306 and is received at each end by respective apertures 116, 120 of the first and second transverse plates 110, 112. Engagement of the pin 316 and the aperture 314 of the upper portion 306 allows the connector 302 to rotate about the axis B.

The lower portion 308 of the connector 302 has first and second opposing side surfaces 318, 320. The lower portion 308 also defines an aperture 322 that extends between the first and second side surfaces 318, 320 along an axis C. The lower portion 308 is attached, by a fastener (not shown), to the cargo hook 304 such that the cargo hook 304 is suspended from the support structure 100 at or near the rearward end portion 104. In this embodiment, the fastener includes a connecting pin (not shown) that extends through an aperture (not shown) of the cargo hook 304 and the aperture 322 of the lower portion 308, and a locking mechanism (not shown) that engages with the connecting pin to secure the cargo hook 304 to the connector 302. Engagement of the connecting pin with the both the aperture 322 of the lower portion 308 and the aperture of the cargo hook 304 allows the cargo hook 304 to rotate about the axis C. It will be appreciated that axis A is parallel to axis C and orthogonal to axis B. This allows the cargo hook 304 to tilt forward, rearward and sideward relative to the helicopter 20 in use.

FIGS. 8 to 11 show an embodiment of a helicopter 20 with the cargo hook assembly 10 attached thereto. For illustrative purposes, the cargo hook assembly 10 is shown without the cargo hook 304. The helicopter 20 may be a Black Hawk, for example, the Sikorsky UH-60, S-70, S-70i, S-70A, S-70B, and S-70C, or a Sea Hawk helicopter. The helicopter 20 comprises a fuselage 400 with an underside 402 and opposing sides 404, 406. Two opposing side mounts 405, 407 are disposed respectively on the opposing sides 404, 406 of the fuselage 400. Each of the side mounts 405, 407 is in the form of a mounting lug defining an aperture. In this embodiment, each of the side mounts is an External Stores Support System (ESSS) mount. A cargo hook mount 408 is also disposed on the underside 402 of the fuselage 400. The cargo hook mount 408 is of the type used for directly mounting a known cargo hook thereon and comprises first and second opposing couplers 408a. Each coupler 408a is sized and shaped to receive the respective mounting arm portions 136, 138 of the attachment mechanism 132 therein.

The cargo hook assembly 10 is attached to the helicopter 20 at three locations, that being at the cargo hook mount location AA and the two side mount locations BB. At the cargo hook mount location AA, each of the mounting arm portions 136, 138 of the attachment mechanism 132 is fixedly received in respective first and second couplers 408a of the cargo hook mount 408. The attachment mechanism 132 is rotatable relative to the attachment member 122 about axis A so as to facilitate attachment of the attachment mechanism 132 to the cargo hook mount 408.

At the two side mount locations BB, the free end portions 204, 206 of the struts 200, 202 are respectively positioned adjacent the side mounts 405, 407 such that the apertures 405a, 407a of the side mounts 405, 407 and the apertures 208 of the free end portions 204, 206 are respectively aligned. In each alignment, a connecting pin 209 is received in the aperture 405a, 407a of the side mount 405, 407 and the aperture 208 of the free end portion 204, 206, and a fastening mechanism engages the connecting pin 209 thereby securing the respective strut 200, 202 to the side mount 405, 407. A user can move the free end portions 204, 206 relative to the transverse member 126 by manipulating the adjustment mechanisms 218 to facilitate positioning of the free end portions 204, 206 adjacent the side mounts 405, 407.

The embodiments described above has numerous advantages. For example, the cargo hook assembly 10 provides a simple and effective retrofitting solution for maximising the lifting capacity of Black Hawk helicopters. By utilising the cargo hook mount 308 and two side mounts of the helicopter 20, the helicopter 20 is able to safely achieve the maximum lifting capacity of 8,000 pounds (3,600 kilograms) afforded by the cargo hook 304. This is due to the downward load on the cargo hook 304 being distributed between the cargo hook mount location and the two side mount locations on the helicopter 20, such that about 75.5% of the downward load is on the cargo hook mount 308 and about 24.5% of the downward load is on the two side mounts of the helicopter 20. Consequently, costs associated with fuel, labour and maintenance of Black Hawk helicopters for cargo transportation are reduced. Further, the cargo hook assembly 10 is easy to manufacture and can easily be attached to the helicopter 20. Moreover, the cargo hook assembly 10 is designed such that it occupies minimal real-estate externally of the helicopter 20, thus not affecting the manoeuvrability and performance of the helicopter 20.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A cargo hook assembly for a helicopter, the cargo hook assembly comprising:
   a support structure having a forward end portion and a rearward end portion;
   an attachment mechanism attached to the rearward end portion and configured to engage a cargo hook mount on the underside of the fuselage of the helicopter, the attachment mechanism having a body and first and second opposing mounting arm portions extending from the body, each of the first and second opposing mounting arm portions being configured to be fixedly received in respective first and second opposing couplers of the cargo hook mount;
   first and second struts extending from respective opposing sides of the forward end portion, each of the first and second struts configured to engage a respective side mount on the fuselage of the helicopter; and
   a cargo hook suspended from the support structure.

2. The cargo hook assembly according to claim 1, wherein the cargo hook is suspended from the support structure at the rearward end portion.

3. The cargo hook assembly according to claim 1, wherein the forward end portion comprises a transverse member comprising first and second opposing ends, and wherein each of the first and second struts is hingedly attached to respective first and second opposing ends.

4. The cargo hook assembly according to claim 1, wherein the cargo hook is rotatable relative to the support structure.

5. A helicopter comprising:
   a fuselage having an underside and opposing sides;
   two opposing side mounts disposed respectively on the opposing sides of the fuselage;
   a cargo hook mount disposed on the underside of the fuselage, the cargo hook mount comprising first and second opposing couplers; and
   a cargo hook assembly comprising:
      a support structure having a forward end portion and a rearward end portion;
      an attachment mechanism attached to the rearward end portion and engaged with the cargo hook mount, the attachment mechanism having a body and first and second opposing mounting arm portions extending from the body, each of the first and second opposing mounting arm portions being fixedly received in respective first and second opposing couplers of the cargo hook mount;
      first and second struts extending from respective opposing sides of the forward end portion, each of the first and second struts being engaged with a respective side mount; and
      a cargo hook suspended from the support structure.

6. The helicopter according to claim 5, wherein the cargo hook is suspended from the support structure at the rearward end portion.

7. The helicopter according to claim 5, wherein the forward end portion comprises a transverse member comprising first and second opposing ends, and wherein each of the first and second struts is hingedly attached to respective first and second opposing ends.

8. The helicopter according to claim 5, wherein the cargo hook is rotatable relative to the support structure.

9. The helicopter according to claim 5, wherein each of the side mounts defines an aperture, and wherein a free end portion of each of the first and second struts defines an aperture.

10. The helicopter according to claim 9, further comprising two or more fasteners for securing the first and second struts to respective side mounts, wherein the apertures of the first and second struts and the apertures of the side mounts are respectively aligned and secured by respective fasteners.

* * * * *